(12) United States Patent
Hinosugi et al.

(10) Patent No.: US 8,553,543 B2
(45) Date of Patent: *Oct. 8, 2013

(54) TRAFFIC SHAPING METHOD AND DEVICE

(75) Inventors: Hideki Hinosugi, Tokyo (JP); Yoshihiko Sakata, Yokohama (JP); Atsushi Anzai, Ebina (JP); Takeshi Kumagai, Atsugi (JP); Shinsuke Nakashima, Yokohama (JP)

(73) Assignee: Alaxala Networks Corporation, Kanagawa (JP)

( * ) Notice: Subject to any disclaimer, the term of this patent is extended or adjusted under 35 U.S.C. 154(b) by 241 days.

This patent is subject to a terminal disclaimer.

(21) Appl. No.: 12/947,182

(22) Filed: Nov. 16, 2010

(65) Prior Publication Data

US 2011/0063978 A1    Mar. 17, 2011

Related U.S. Application Data

(63) Continuation of application No. 12/323,578, filed on Nov. 26, 2008, now Pat. No. 7,855,960.

(30) Foreign Application Priority Data

Jan. 30, 2008  (JP) ................................. 2008-018490

(51) Int. Cl.
*H04J 3/16* (2006.01)
*H04L 12/26* (2006.01)
*H04L 12/56* (2012.01)
*G06F 15/16* (2006.01)

(52) U.S. Cl.
USPC ........ 370/230.1; 370/232; 370/235; 370/252; 370/315; 709/224; 709/233

(58) Field of Classification Search
USPC .............. 370/230, 230.1, 232, 234, 235, 252, 370/315, 389, 392, 395.2
See application file for complete search history.

(56) References Cited

U.S. PATENT DOCUMENTS

| | | | |
|---|---|---|---|
| 6,546,424 B1 * | 4/2003 | Cucchiara | .................... 709/226 |
| 6,912,225 B1 | 6/2005 | Kohzuki et al. | |
| 6,920,109 B2 | 7/2005 | Yazaki et al. | |
| 7,420,917 B2 | 9/2008 | Ishikawa et al. | |

(Continued)

FOREIGN PATENT DOCUMENTS

| | | |
|---|---|---|
| JP | 2000-332787 | 11/2000 |
| JP | 2004-282728 | 10/2004 |

(Continued)

*Primary Examiner* — Candal Elpenord
(74) *Attorney, Agent, or Firm* — Mattingly & Malur, PC

(57) ABSTRACT

A packet relay device comprises a distribution processing unit classifying traffics into groups and users based on header information of packets received; a calculation unit calculating available frame rate of each user from peak frame rate, minimum frame rate, and weight information set for each user; a scheduling control unit updating a transmission schedule point-in-time calculated based on the available frame rate of each user, and judging which packet should be transmitted in accordance with the transmission schedule point-in-time updated; and a shaping unit updating a transmission schedule point-in-time calculated based on the peak frame rate of each user, and performing a shaping of packets at the peak frame rate on each user basis in accordance with the transmission schedule point-in-time updated; and a priority-control processing unit performing a strict priority control over transmission of packets of each group in correspondence with degree of priority of each group.

4 Claims, 7 Drawing Sheets

(56) References Cited

U.S. PATENT DOCUMENTS

| | | |
|---|---|---|
| 7,486,617 B2 | 2/2009 | Kokko |
| 7,492,776 B2 | 2/2009 | Saikusa et al. |
| 7,606,154 B1 | 10/2009 | Lee |
| 8,032,653 B1 * | 10/2011 | Liu et al. .................. 709/235 |
| 8,233,426 B2 * | 7/2012 | Han et al. .................. 370/318 |
| 8,379,520 B2 * | 2/2013 | Ahmed et al. .............. 370/234 |
| 2001/0016914 A1 * | 8/2001 | Tabata ........................ 713/201 |
| 2004/0125815 A1 * | 7/2004 | Shimazu et al. ............ 370/411 |
| 2004/0208123 A1 | 10/2004 | Sakata et al. |
| 2005/0063392 A1 * | 3/2005 | Ofuji et al. .............. 370/395.42 |
| 2006/0023659 A1 * | 2/2006 | Abedi ......................... 370/328 |
| 2007/0002750 A1 * | 1/2007 | Sang et al. .................. 370/238 |
| 2008/0095053 A1 | 4/2008 | Chen et al. |
| 2008/0107020 A1 | 5/2008 | Trinh et al. |
| 2009/0316714 A1 * | 12/2009 | Kodaka et al. ............. 370/412 |

FOREIGN PATENT DOCUMENTS

| | | |
|---|---|---|
| JP | 2005-123919 | 5/2005 |
| JP | 2005-354738 | 12/2005 |
| JP | 2006-211306 | 8/2006 |
| JP | 2007-013462 | 1/2007 |
| JP | 2007-243382 | 9/2007 |

* cited by examiner

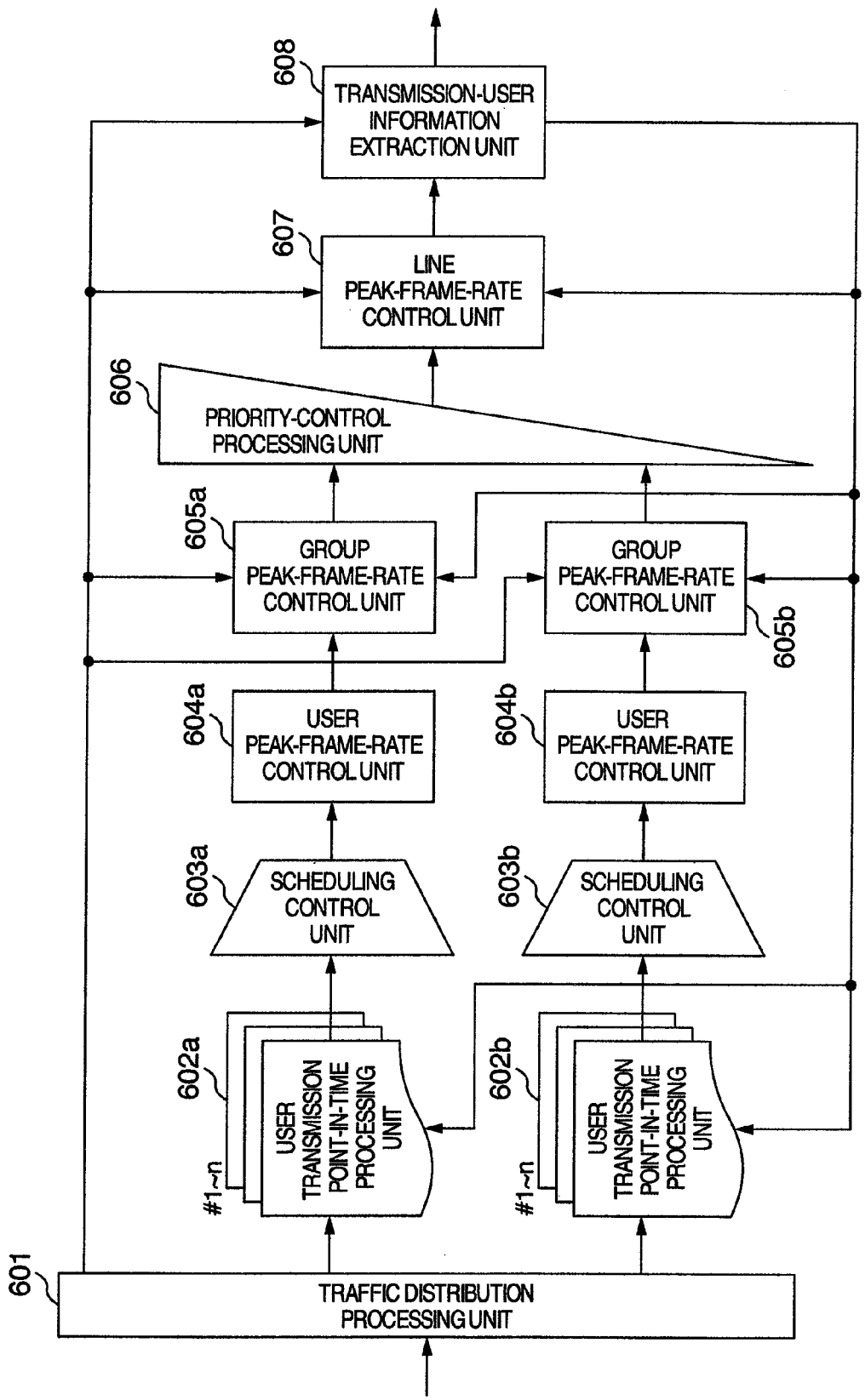

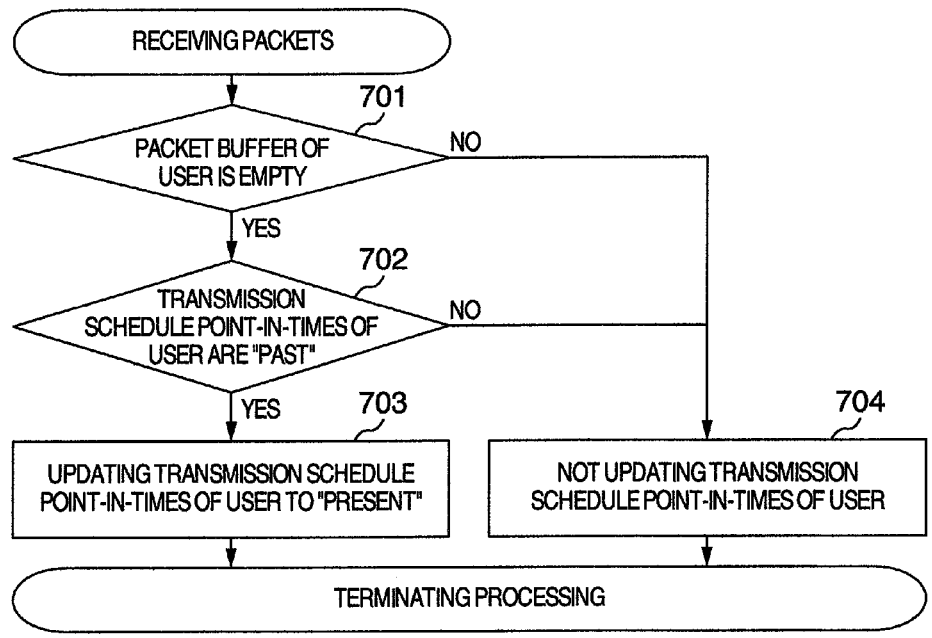
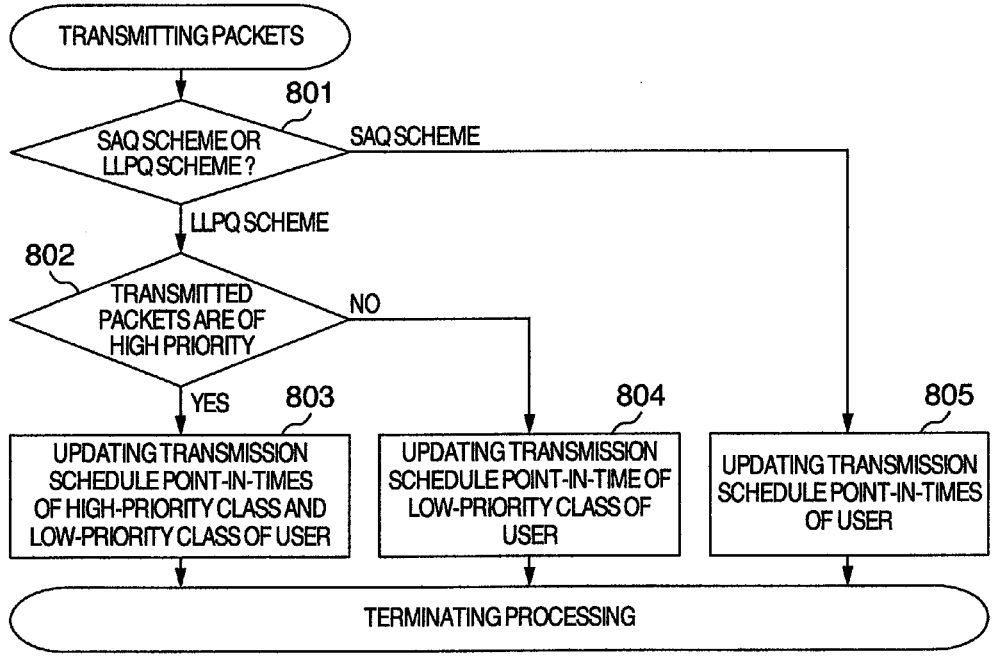

TRAFFIC SHAPING METHOD AND DEVICE

INCORPORATION BY REFERENCE

The present application claims priority from Japanese application JP2008-018490 filed on Jan. 30, 2008, the content of which is hereby incorporated by reference into this application.

BACKGROUND OF THE INVENTION

1. Field of the Invention

The present invention relates to a traffic shaping method and device in communications fields.

2. Description of the Related Art

In recent years, significant progress has been made in implementation of the broadband in IP networks. In accompaniment with this progress, there has been a more and more growing trend to implement high-real-time-property contents such as telephones and broadcasts on the IP networks in addition to Internet traffics such as HTTP and FTP. Properties of the traffics like these and traffic control requirements needed for network environments range over a variety of types. Accordingly, in order to address these various types of requests, availability-having traffic control technologies have become necessary. For example, in the traffics such as HTTP and FTP (which, hereinafter, will be referred to as the Internet traffics), even if some extent of communications discard occurs during communications, this communications discard can be tolerated. This is because integrity of the communications can be ensured by a resending processing based on the TCP/IP. Nevertheless, a control becomes necessary which should be executed over a mechanism (i.e., minimum frame-rate guarantee, or weight-equal frame-rate distribution) for ensuring neutrality of an inter-users frame rate without permitting a bad influence to be exerted on other user's communications by a condition that the utilization frame rate by a particular user is high. On the other hand, in the traffics such as telephones and broadcasts (which, hereinafter, will be referred to as the real-time traffics), this real-time traffics are needed to be equipped with a mechanism for preventing the traffic's bursting (which means that the traffics are sent in large amounts at a time) from occurring while precluding the transfer latency down to the smallest possible degree for implementing smooth communications. If the traffics burst, a reception-packet buffer is needed to be deployed within an appliance (such as, e.g., telephone or set top box) for receiving and reproducing the traffics. Accordingly, there is a danger of causing a problem to occur, such as connectivity due to the appliance. Also, when the IP multicast is used in an image delivery, a buffer for copying a multicast packet and storing the copied packets temporarily in a manner of being expanded is needed to be deployed within a relay device, or a repeater (such as, e.g., Ethernet (: registered trademark) switch), which is a copy point for the multicast packet. At this time, if the traffics burst, a size to be requested for the buffer becomes large. Consequently, there is a danger of resulting in a packet discard due to the buffer shortage, or an increase in the appliance cost.

Also, in an inter-service-points connection in a general enterprise, in many cases, the inter-service-points connection is established via a virtual private network (such as, e.g., Wide-Area Ethernet (: registered trademark)) that has a contract system where charge frame rate differs depending on line speeds. Each user selects a necessary line speed to a service provider to make the contract, thereby ensuring a communications path between the service points. A repeater of the service provider positioned at the entrance of the virtual private network is equipped with a processing function for monitoring the frame rate of each user all the time to supervise whether or not packets whose amount is larger than a contracted frame rate have flown into the repeater, and for discarding excess packets if any. With respect to the traffic which has exceeded the contracted frame rate, the service provider executes its discard regardless of the traffic's degree of importance. In order to avoid the packet discard within the virtual private network, each user deploys the repeater, which is capable of performing a shaping of the traffic in accordance with the contracted frame rate, on a connection line with the virtual private network at each service point. When establishing the connection with respect to a plurality of service points, each user deploys the traffic-shaping-capable repeater on each service-point basis. When addressing the real-time traffics under the circumstances like this, a mechanism becomes necessary which allows the real-time traffics to be transferred with low-discard/low-latency while performing the traffic shaping on each service-point basis simultaneously.

As conventional traffic control technologies, in JP-A-2006-211306 and JP-A-2005-123919, the following traffic control technology is disclosed: Namely, traffics are classified into a high-priority class and a non-priority class. Then, the latency which will occur within the repeater with respect to the traffic classified into the high-priority class is minimized by always transmitting the high-priority traffic with the highest priority. In JP-A-2004-282728, the following shaping method is disclosed: Namely, the peak frame rate and the minimum frame rate are set for each of a plurality of users, then calculating a packet transmission schedule point-in-time for each user. Moreover, scheduling for a transmission timing for the traffic of each user is performed from this transmission schedule point-in-time. In JP-A-2007-013462, the following traffic control technology is disclosed: Namely, a simultaneous traffic scheduling for both the high-priority class and the low-priority class is implemented as follows: The transfer latency of the high-priority class is minimized. Then, when the traffic of the high-priority class is transmitted, a transmission counter of a user is updated by sending the packet length and the user information on the user a scheduler circuit of the low-priority class. This process allows the implementation of the simultaneous traffic scheduling.

In order to implement the real-time applications such as the high-quality telephones and broadcasts on the IP networks, different traffic control technologies have become necessary, depending on their respective service traffics characteristics and network environments. Hereinafter, the description will be given below concerning network requirements requested, i.e., problems to be solved by the present invention.

Network Requirement (1)

While reducing the discard/latency down to the smallest possible degree with respect to the traffics for which the real-time property is requested, carrying out the traffic shaping for suppressing the burst property of the traffics at the frame rate determined on each flow (i.e., channel) basis. Also, ensuring the neutrality of an inter-users frame rate (i.e., minimum frame-rate guarantee, or weight-equal frame-rate distribution) with respect to the Internet traffics (low priority).

With respect to the above-described problem (i.e., the network requirement (1)), in JP-A-2006-211306 and JP-A-2005-123919, the configuration is that the highest priority is always given to the high-priority traffic. Accordingly, the latency which will occur within the repeater with respect to the high-priority traffic can be minimized. The traffic burst, however, cannot be suppressed on each session (i.e., queue) basis. Consequently, there is a danger of causing a problem that traffic's latency fluctuation (i.e., latency jitter), which occurs by the traffic's having been transmitted via the network, will be propagated as it is. As described earlier, if the mechanism for preventing the burst property of the traffics does not exist on each flow basis, the packet discard due to the buffer shortage occurs in such devices as the reception/reproduction appliance or the repeater which becomes the multicast copy point. Consequently, there is a possibility of resulting in a lowering in the communications quality.

Also, in JP-A-2004-282728, the scheduling for the inter-users packet transmission timings is performed based on the peak frame rate and the minimum frame rate set for each of the plurality of users. In the case of this configuration, however, it is difficult to guarantee sufficient latency quality with respect to the real-time traffics. This is because, in JP-A-2004-282728, the inter-users transmission scheduling processing is performed independently of the type of the traffic with which the communications is being performed. After a user which should transmit the traffic has been determined, a priority control processing or the like is carried out within the user. As a result, the transmission timing for the high-priority traffic is delayed because of the competition of the scheduling processing with the low-priority traffic of another user. As the users which perform the scheduling increase in number, it becomes more and more difficult to neglect the latency due to the inter-users scheduling. Accordingly, it is difficult to offer the sufficient latency quality to the real-time traffics.

Network Requirement (2)

While performing the traffic shaping on each service-point basis, and while reducing the discard/latency down to the smallest possible degree with respect to the traffic for which the real-time property is requested, carrying out the traffic shaping for suppressing the burst property. Also, performing the communications in such a manner that the Internet traffics (low priority) takes advantage of a remaining frame rate which results from subtracting the utilization frame rate by the real-time traffics from the shaping frame rate with respect to each service point.

The difference between the network requirement (2) and the network requirement (1) lies in the point that the discard/latency of the real-time traffic is suppressed while performing the frame-rate limitation of the traffic on each destination-address (i.e., service-point) basis. In the network requirement (1), the traffics are classified on each service basis, then carrying out the shaping/scheduling processing with respect to each classified traffic. In the network requirement (2), on the other hand, the requirement is that the traffic shaping is carried out with respect to the frame rate on each service-point basis including the inter-services frame rate.

With respect to the problem like this (i.e., the network requirement (2)), in JP-A-2004-282728, as exactly described earlier, the problem that the latency is deteriorated for the high-priority traffic is contained therein. Accordingly, it is difficult to reduce the latency with respect to the real-time traffics. Also, in JP-A-2007-013462, the latency of the high-priority class packets is reduced, thereby allowing the implementation of the simultaneous scheduling for both the high-priority class frame rate and the low-priority class frame rate. In JP-A-2007-013462, however, a function for controlling the peak frame rate for the high-priority class packets does not exist. As a result, there is a possibility that the high-priority class traffic will occupy all the line frame rates depending on the traffic input circumstances. In this case, the transmission of the high-priority class traffic at another service point will also be suppressed. Consequently, there is a problem that the traffic shaping on each service-point basis, i.e., the present requirement, will exhibit no effect.

SUMMARY OF THE INVENTION

In the present invention, there is provided a traffic shaping method and device for solving the above-described problems. In the present invention, there is provided a packet relay device having a traffic shaping function, the packet relay device including a distribution processing unit for classifying traffics into group and user units based on header information of packets received, a calculation unit for calculating available frame rate of each user from peak frame rate, minimum frame rate, and weight information set in the user unit, a scheduling control unit for updating a transmission schedule point-in-time calculated based on the available frame rate of each user, and judging that packets should be transmitted in accordance with the transmission schedule point-in-time updated, which of the users the packets having been distributed into, a shaping unit for updating a transmission schedule point-in-time calculated based on the peak frame rate of each user, and performing a shaping of the packets at the peak frame rate on each user basis in accordance with the transmission schedule point-in-time updated, and a priority-control processing unit for performing a strict priority control over the transmission of the packets of each group in correspondence with degree of priority of each group.

Also, in the present invention, there is provided a packet relay device having a traffic shaping function, the packet relay device including a distribution processing unit for classifying traffics into user and class units based on header information of packets received, a calculation unit for calculating available frame rate for each user and a high-priority class of each user from peak frame rate, minimum frame rate, and weight information set in the user unit and the high-priority class unit of each user, a first scheduling control unit for updating a transmission schedule point-in-time calculated based on the available frame rate for each user and the high-priority class of each user, and judging that packets of the high-priority class should be transmitted in accordance with the transmission schedule point-in-time updated, which of the users the packets of the high-priority class having been distributed into, a second scheduling control unit for updating a transmission schedule point-in-time calculated based on the available frame rate for the high-priority class of each user, and judging that packets of a non-high-priority class should be transmitted in accordance with the transmission schedule point-in-time updated, which of the users the packets of the non-high-priority class having been distributed into, a shaping unit for updating a transmission schedule point-in-time calculated based on the peak frame rate for each user and the high-priority class of each user, and performing a shaping of the packets at the peak frame rate on each user basis and on each user's class basis in accordance with the transmission schedule point-in-time updated, and a priority-control processing unit for performing a strict priority control over the transmission of the packets of each group in correspondence with degree of priority of each group.

According to the present invention, while reducing the discard/latency down to the smallest possible degree with respect to the traffics for which the real-time property is requested, the traffic shaping for suppressing the burst property of the traffics can be carried out at the frame rate determined for each flow (i.e., channel). Also, the neutrality of an inter-users frame rate (i.e., minimum frame-rate guarantee, or weight-equal frame-rate distribution) can be ensured with respect to the Internet traffics (low priority). Also, while performing the traffic shaping on each service-point basis, and while reducing the discard/latency down to the smallest possible degree with respect to the traffics for which the real-time property is requested, the traffic shaping for suppressing the burst property can be carried out. Also, the communications can be performed in such a manner that the Internet traffics (low priority) take advantage of a remaining frame rate which results from subtracting the utilization frame rate by the real-time traffics from the shaping frame rate with respect to each service point.

BRIEF DESCRIPTION OF THE DRAWINGS

FIG. 6 illustrates a block diagram of a frame-rate control controller;

FIG. 7 illustrates an update flow of a user transmission schedule point-in-time at the time of packet reception; and FIG. 8 illustrates an update flow of a user transmission schedule point-in-time at the time of packet transmission.

DESCRIPTION OF THE INVENTION

Figure 1:
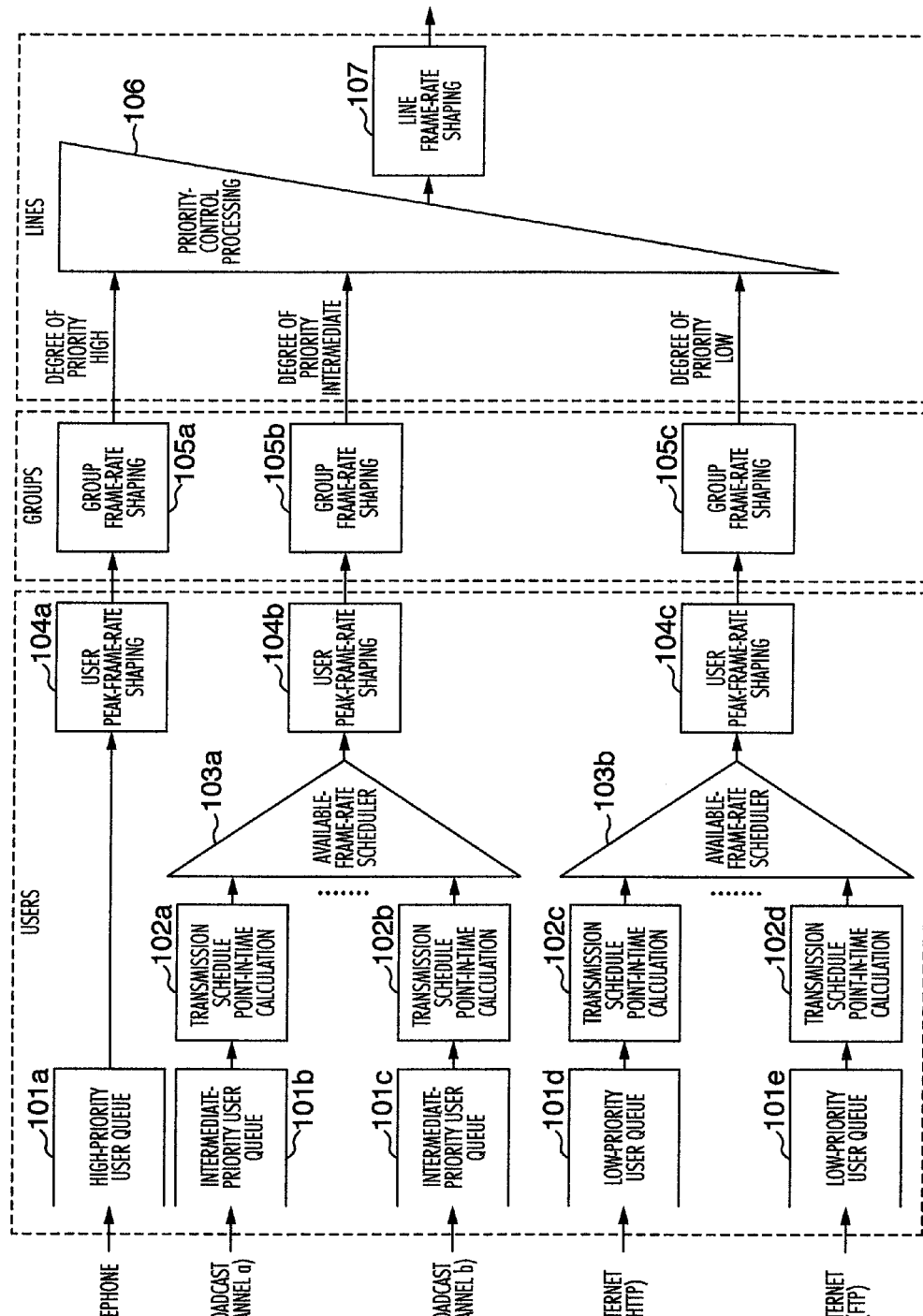
FIG. 1 illustrates a queue configuration example 1 of a traffic shaping device in the present embodiment.

In order to implement the network requirement (1), in a traffic shaping device in the present embodiment, as illustrated in FIG. 1, there is provided a mechanism including the following configuration components: High-priority/intermediate-priority/low-priority user queues 101 for performing queuing of traffics by classifying the traffics into, e.g., the high-priority/intermediate-priority/low-priority for each service of the telephone/broadcast/Internet, transmission schedule point-in-time calculations 102 having a function for calculating available frame rate from peak-frame-rate/minimum-frame-rate/weight set for each user, and managing a transmission schedule point-in-time determined from the peak-frame-rate/available-frame-rate, available-frame-rate schedulers 103 for controlling a scheduling in accordance with the transmission schedule point-in-time of the available frame rate transmitted from the transmission schedule point-in-time calculations 102, user peak-frame-rate shapings 104 for checking the transmission schedule point-in-time at the peak frame rate of each user, and suppressing the transmission until the present point-in-time has attained to the transmission schedule point-in-time, group frame-rate shapings 105 for checking the transmission schedule point-in-time at the peak frame rate of each group, and suppressing the transmission until the present point-in-time has attained to the transmission schedule point-in-time, a priority-control processing 106 for transmitting a group of the highest priority degree with the highest priority from among transmission candidates of each group, and a line frame-rate shaping 107 for checking the transmission schedule point-in-time at the peak frame rate of each line, and suppressing the transmission until the present point-in-time has attained to the transmission schedule point-in-time.

In FIG. 1, the telephone traffics are inputted into the user queues of the high-priority group, the broadcast traffics are inputted into the user queues of the intermediate-priority group on each flow (i.e., channel) basis, and the Internet traffics are inputted into the user queues of the low-priority group. As classification of the users, e.g., the following processing is conceivable: All the telephone traffics are processed as a single user. The broadcast traffics are processed such that the users are classified on each channel basis. The Internet traffics are processed such that the users are classified on each protocol basis such as HTTP or FTP.

The employment of the packet scheduling scheme like this makes it possible to provide the traffic control technology which satisfies the network requirement (1) successfully. Concretely, the telephone traffics addressed as the high-priority group are controlled so that the discard/latency of the telephone traffics will be reduced down to the smallest possible degree. This is because the priority-control processing 106 executes the strict priority control where the high-priority group is always transmitted with a higher priority than those of the other groups. Moreover, the traffic shaping for suppressing the burst property can be carried out by the group frame-rate shaping 105a. Also, with respect to the broadcast/Internet traffics addressed as the intermediate-priority/low-priority groups, the neutrality of an inter-users frame rate can be ensured. This is because the transmission schedule point-in-time in correspondence with each user is managed, and because the traffic of each user is transmitted based on the transmission schedule point-in-time of the available frame rate and the peak frame rate of each user.

Figure 2:
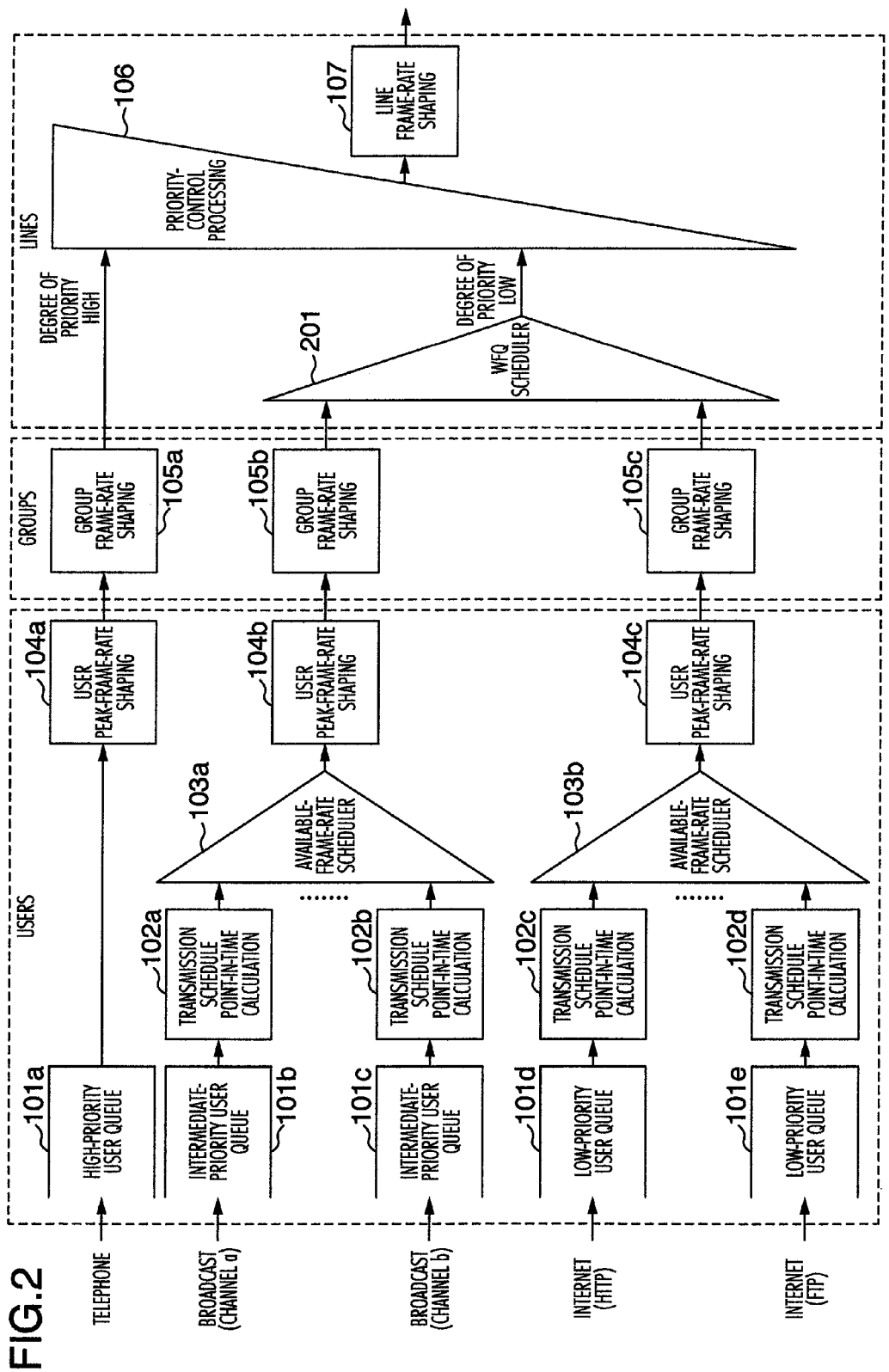
FIG. 2 illustrates a queue configuration example 2 of the traffic shaping device in the present embodiment.

Also, in FIG. 1, the strict priority control is performed over the scheduling processing between the respective groups. The inter-group control, however, may also be performed in such a manner that the strict priority control and the scheduling processing are combined with each other. Namely, as illustrated in FIG. 2, the strict priority control may be performed by the priority-control processing 106 after deploying a WFQ scheduler 201 for executing the Weighted Fair Queuing (which, hereinafter, will be referred to as the WFQ) between the two groups.

The WFQ is an algorithm for performing a scheduling as to from which of a plurality of existing queues a packet should be transmitted on the basis of weights set for these queues. Namely, each weight is set for each queue, then distributing the frame-rate resource on the basis of each weight. Since the WFQ distributes the frame-rate resource such that each transmission packet-length is taken into consideration, the WFQ is capable of distributing the frame-rate resource in a beautiful manner.

Figure 3:
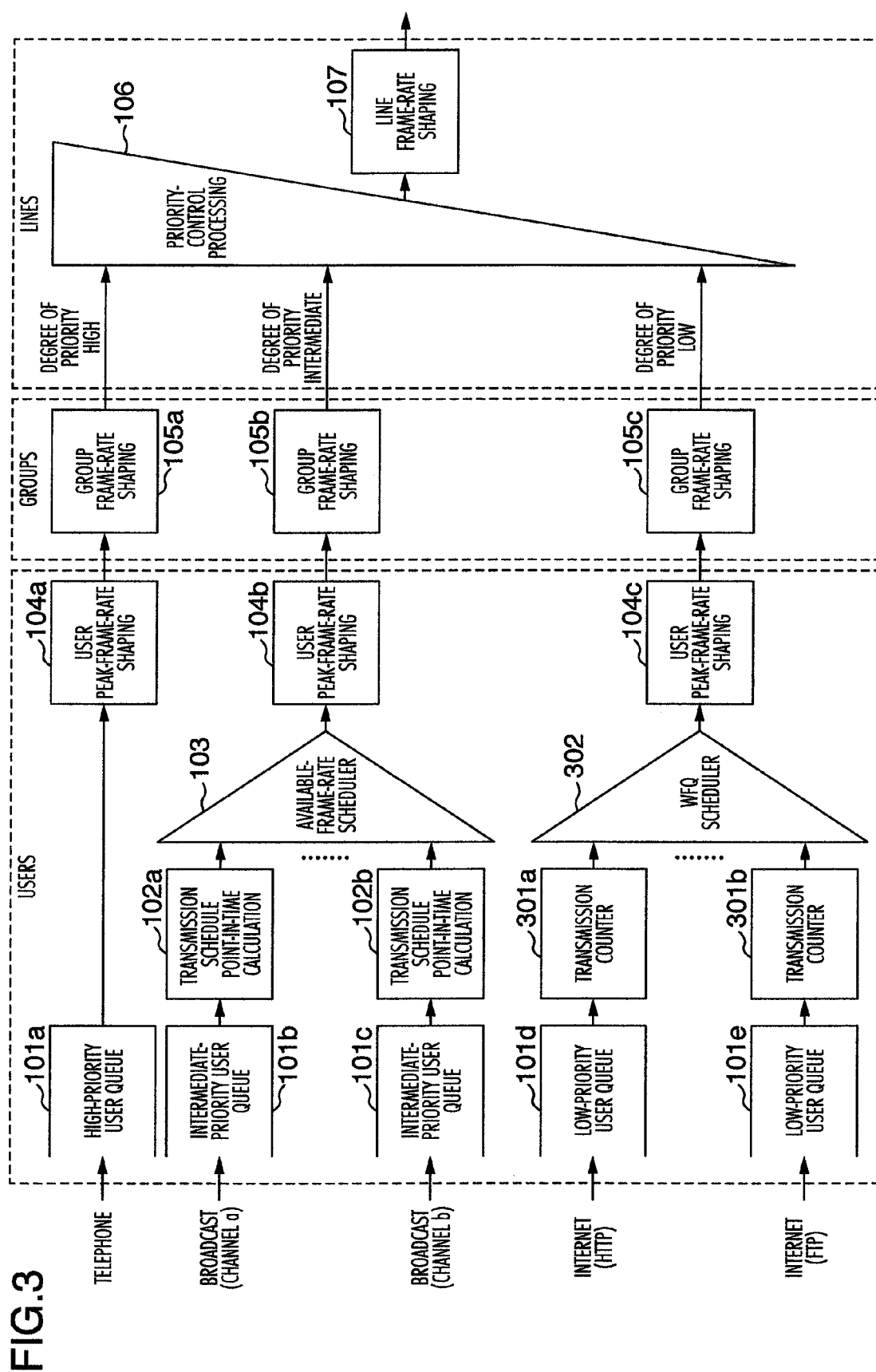
FIG. 3 illustrates a queue configuration example 3 of the traffic shaping device in the present embodiment.

Also, as illustrated in FIG. 3, the WFQ-type scheduling may also be employed in the scheduling processing between the respective users. In this case, transmission counters 301, which are updated based on each weight and each transmission packet-length set for each user at the time of packet transmission/reception, and a WFQ scheduler 302 for performing the WFQ scheduling from the transmission counters 301 are deployed for each user of a group in which the WFQ scheduling is performed.

Incidentally, the reason for deploying not a WRR (: Weighted Round Robin)-type scheduler but the WFQ-type scheduler is that the following problems occur: Namely, the WRR-type scheduler finds it difficult to fairly distribute the inter-users frame rate based on each transmission packet-length. As a result, the traffic is biased toward a specific user due to each transmission packet-length. Also, even if the line frame rate remains unoccupied, a communications-incapable wasted and unused frame rate occurs. The WRR-type scheduler need not have the counter for each queue, and thus is simple in its mechanism and is easy to implement. Nevertheless, the WFQ should be used in order to accomplish an object of protecting the fairness of the inter-users frame-rate resource on a line interface such as Ethernet (: registered trademark) on which the packet size for each packet differs.

Incidentally, the scheme according to the present invention, i.e., the groups are classified on each service-application basis, and are queued into their own respective queues, will be referred to as the Service Adapted Queuing scheme (which, hereinafter, will be referred to as the SAQ scheme). Additionally, in FIG. 1 to FIG. 3, the explanation has been given setting the group number at three. The group number, however, may be expanded or reduced into an arbitrary number if required. Accordingly, it does not limit the scope of the appended claims according to the present invention.

Here, an effect acquired by employing the SAQ scheme will be summarized. The effect acquired by employing the SAQ scheme is to provide the traffic control technology which is capable of flexibly addressing the requests for different communications qualities for each-type service (i.e., telephone/broadcast/Internet).

In communications, the various types of requests, such as the communications for which the real-time property or certainty is requested, exist depending on the types of the services. In general, the real-time property is requested for the telephone, the real-time property and the traffic-burst suppression for each flow (i.e., channel) are requested for the broadcast, and the certainty and the neutrality are requested for the Internet. In the SAQ scheme, there is provided the traffic control technology which is capable of flexibly addressing the various types of requests like this.

As illustrated in FIG. 1, the voice traffics are mapped into the high-priority user queue 101a. Then, the voice traffics are subjected to the transmission processing with the higher priority than those of the other groups by the priority-control processing 106. This processing makes it possible to ensure the real-time property. Also, the broadcast traffics are mapped into the intermediate-priority user queue 101b in the channel unit. Then, while the scheduling is being performed by the available-frame-rate scheduler 103a, the burst property of the broadcast traffics is suppressed at the peak frame rate set into the channel unit by the user peak-frame-rate shaping 104b. Moreover, the broadcast traffics are subjected to the transmission processing in the priority order which is the next to that of the high-priority traffics (i.e., the voice). This processing makes it possible to ensure the real-time property. Also, the Internet traffics are mapped into the low-priority user queue 101d in the user unit. Then, the transmission scheduling is performed by the available-frame-rate scheduler 103b. This processing makes it possible to ensure the fairness and the certainty of the transmission frame rate for each user. Also, the frame rate which has been not used by the traffics of the above-described high-priority/intermediate-priority groups is subjected to the frame-rate distribution (up to the user peak frame rate) on the basis of each weight. This frame-rate distribution processing allows the frame-rate resource to be fairly distributed among the users of the low-priority group, thereby making it possible to make an effective use of the line resource.

Also, as illustrated in FIG. 3, when the WFQ scheduler 302 is used for the scheduling control among the users of the low-priority group, the transmission frame rate of each user of the low-priority group can be implemented and provided in such a manner that the frame rate which has been not used by the high-priority/intermediate-priority traffics is equally distributed to each user on the basis of each weight set for each user. Incidentally, when the group frame-rate shaping 105c for limiting the total frame rate of the low-priority group is activated, if the frame rate which has been not used by the high-priority/intermediate-priority traffics is higher than the peak frame rate of the low-priority group, the frame-rate distribution to each user is carried out on the basis of each weight from the peak frame rate of the low-priority group.

As having been explained so far, the traffic shaping technology according to the SAQ scheme makes it possible to solve the network traffic requirement (1).

Figure 4:
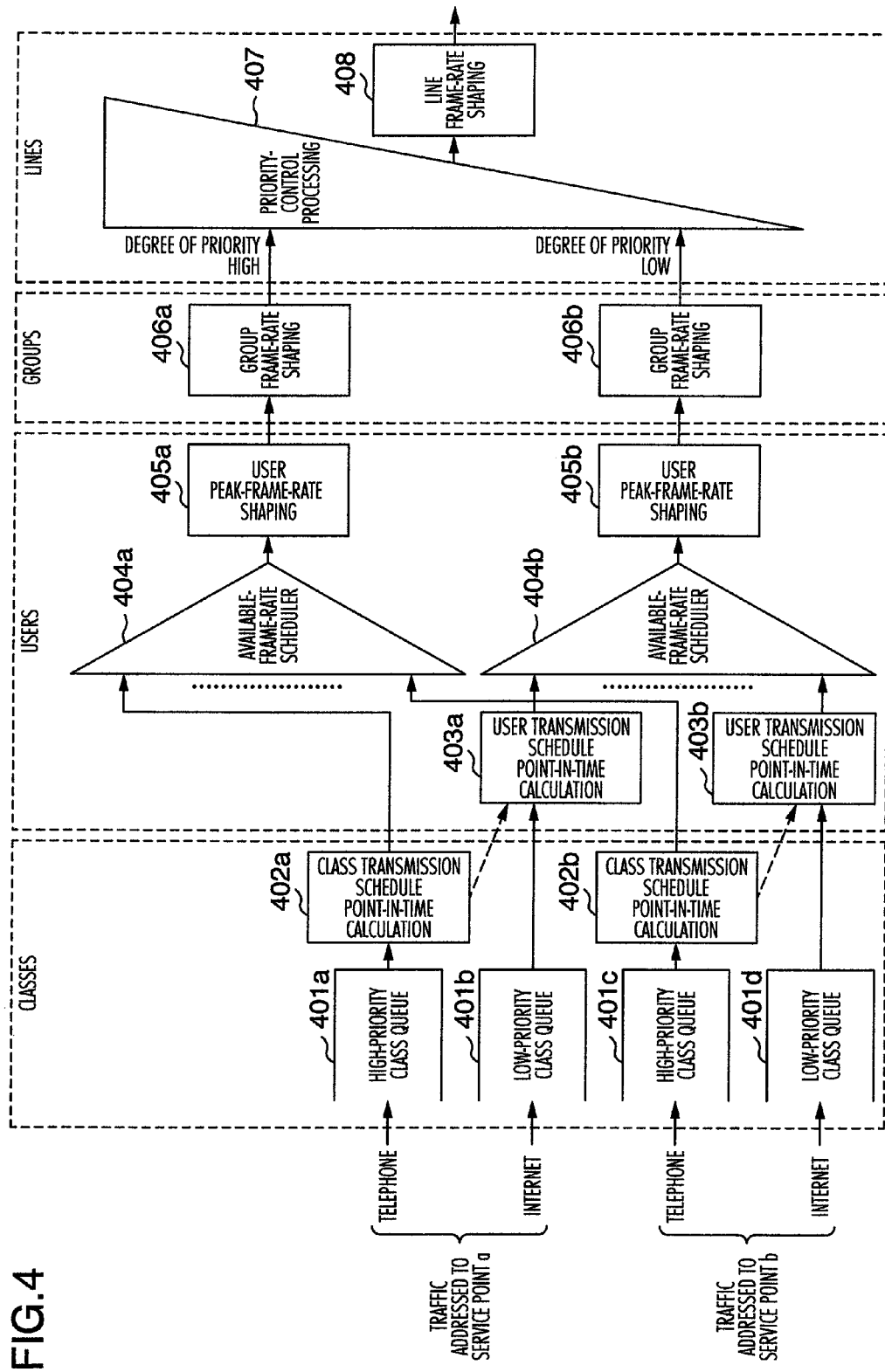
FIG. 4 illustrates a queue configuration example 4 of the traffic shaping device in the present embodiment.

Also, in order to implement the network requirement (2), in the traffic shaping device in the present embodiment, as illustrated in FIG. 4, there is provided a mechanism including the following configuration components: High-priority/low-priority class queues 401 for performing queuing of traffics by classifying the traffics depending on the priority degree for each class of users (in FIG. 4, the telephone is allocated to the high-priority class, and the Internet is allocated to the low-priority class. Also, the users are equivalent to the service points in the network requirement (2).) class transmission schedule point-in-time calculations 402 having a function for calculating available frame rate from peak-frame-rate/minimum-frame-rate/weight set for each high-priority class queue, and managing a transmission schedule point-in-time determined from the peak-frame-rate/available-frame-rate, user transmission schedule point-in-time calculations 403 for calculating available frame rate from peak-frame-rate/minimum-frame-rate/weight set for the total frame rate of the high-priority/low-priority classes (i.e., frame rate allowable on each user (i.e., service point) basis), and managing a transmission schedule point-in-time determined from the peak-frame-rate/available-frame-rate, available-frame-rate schedulers 404 for controlling a scheduling in accordance with the transmission schedule point-in-time of the available frame rate transmitted from the class transmission schedule point-in-time calculations 402 or the user transmission schedule point-in-time calculations 403, user peak-frame-rate shapings 405 for checking the transmission schedule point-in-time at the peak frame rate of each user, and suppressing the transmission until the present point-in-time has attained to the transmission schedule point-in-time, group frame-rate shapings 406 for checking the transmission schedule point-in-time at the peak frame rate of each group (in FIG. 4, the telephone traffics are addressed as the high-priority group, and the Internet traffics are addressed as the low-priority group.), and suppressing the transmission until the present point-in-time has attained to the transmission schedule point-in-time, a priority-control processing 407 for transmitting a group of the highest priority degree with the highest priority from among transmission candidates of each group, and a line frame-rate shaping 408 for checking the transmission schedule point-in-time at the peak frame rate of each line, and suppressing the transmission until the present point-in-time has attained to the transmission schedule point-in-time.

In FIG. 4, the dotted arrows which connect the class transmission schedule point-in-time calculations 402 with the user transmission schedule point-in-time calculations 403 mean not the exchange of the packet information, but the exchange of a signal for imposing a penalty by the amount of transmitting packets of the high-priority class queues onto the transmission schedule point-in-time of the user. This exchange of the signal allows the packet transmission of the low-priority class queues to be suppressed in correspondence with the amount of transmitting the packets of the high-priority class queues. As a result, the traffic shaping can be performed on each user (i.e., service-point) basis including the high priority and the low priority. This traffic shaping allows the traffics of the low-priority class queue packets to be limited to the remaining frame rate which results from subtracting the utilization frame rate by the real-time traffics from the shaping frame rate with respect to each service point.

Also, the telephone traffics of the high-priority class addressed as the high-priority group are controlled so that the discard/latency of the telephone traffics will be reduced down to the smallest possible degree. This is because the priority-control processing 407 executes the strict priority control where the high-priority group is always transmitted with a higher priority than those of the other groups. Moreover, the traffic shaping for suppressing the burst property can be carried out by the group frame-rate shaping 406a. This makes it possible to provide the traffic control technology which satisfies the network requirement (2) successfully.

In FIG. 4, the example has been given where the two types of traffics, i.e., the telephone traffics and the Internet traffics, are classified, then being mapped into the two classes, i.e., the high-priority class and the low-priority class of each user queue. The class number, however, may be expanded if required. Accordingly, it does not limit the scope of the appended claims according to the present invention. Also, unlike the operation at the time when the PQ control is exercised within the user queue in JP-A-2004-282728, the traffics are separated into the groups at the class level then to execute the priority control between the groups. This operation results in a feature of permitting the high-priority class traffics to be transferred at a low latency without being influenced at all by the low-priority class traffics. As a result, when considered in the user-unit processing, this example seems to implement a strict priority scheme at the low latency. This solving method provided by the present invention will be referred to as Low Latency Priority Queuing scheme (which, hereinafter, will be referred to as the LLPQ scheme).

Here, an effect acquired by employing the LLPQ scheme will be summarized. The effect acquired by employing the LLPQ scheme is to provide the traffic control technology which is capable of flexibly addressing the requests for different communications qualities for each-type service (i.e., telephone/broadcast/Internet) on the WAN services such as Wide-Area Ethernet (: registered trademark) and IP-VPN. The difference between the SAQ scheme and the LLPQ scheme lies in the point that its application on the WAN services is assumed, and that the condition is premised where the transmission-capable frame rate for each service-point address is limited. Namely, the object itself of providing the traffic control which is optimum for each-type service remains the same.

As illustrated in FIG. 4, the voice traffics are mapped into each high-priority class queue 401 in the user unit. While the transmission scheduling for the high-priority class of each user is being performed by the available-frame-rate scheduler 404a, the traffics are suppressed at the peak frame rate of the high-priority class of each user by the user peak-frame-rate shaping 405a. The transmission processing is performed with the higher priority than that of the low-priority class traffics by the priority-control processing 407, thereby ensuring the real-time property.

The Internet traffics are mapped into each low-priority class queue 401b in the user unit. In the user transmission schedule point-in-time calculation 403a, the transmission schedule point-in-time is managed based on the peak-frame-rate/minimum-frame-rate/weight set in the user unit including the high-priority classes. In the available-frame-rate scheduler 404b, the transmission scheduling on each service-point basis including the high-priority class traffics becomes implementable. In the user peak-frame-rate shaping 405b as well, the traffics can be suppressed at the peak frame rate on each service-point basis including the high-priority class traffics. Also, the traffics of the low-latency class can be implemented and provided in such a manner that the frame-rate resource which has been not used by the high-priority classes is fairly distributed between the low-priority classes of each user on the basis of each weight, while guaranteeing the transmission frame rate which results from subtracting the frame rate at which the transmission has been performed by the high-priority class traffics. This fair distribution makes it possible to make an effective use of the line resource.

Incidentally, if an actually inputted frame rate is slower than the frame rate set for the high-priority classes, the unused frame rate which has been not used by the high-priority class traffics can be used by the low-priority class traffics of the user. Accordingly, if the frame rates of the inter-users high-priority/low-priority classes are added to each other, the neutrality of the inter-users traffics can be guaranteed.

As having been explained so far, the traffic shaping technology according to the LLPQ scheme makes it possible to solve the network traffic requirement (2).

In the case of using the traffic shaping device in the present embodiment, the optimum scheme needs to be selected out of the SAQ scheme and the LLPQ scheme, depending on the circumstances such as the network configuration and traffic requirements.

Figure 5:
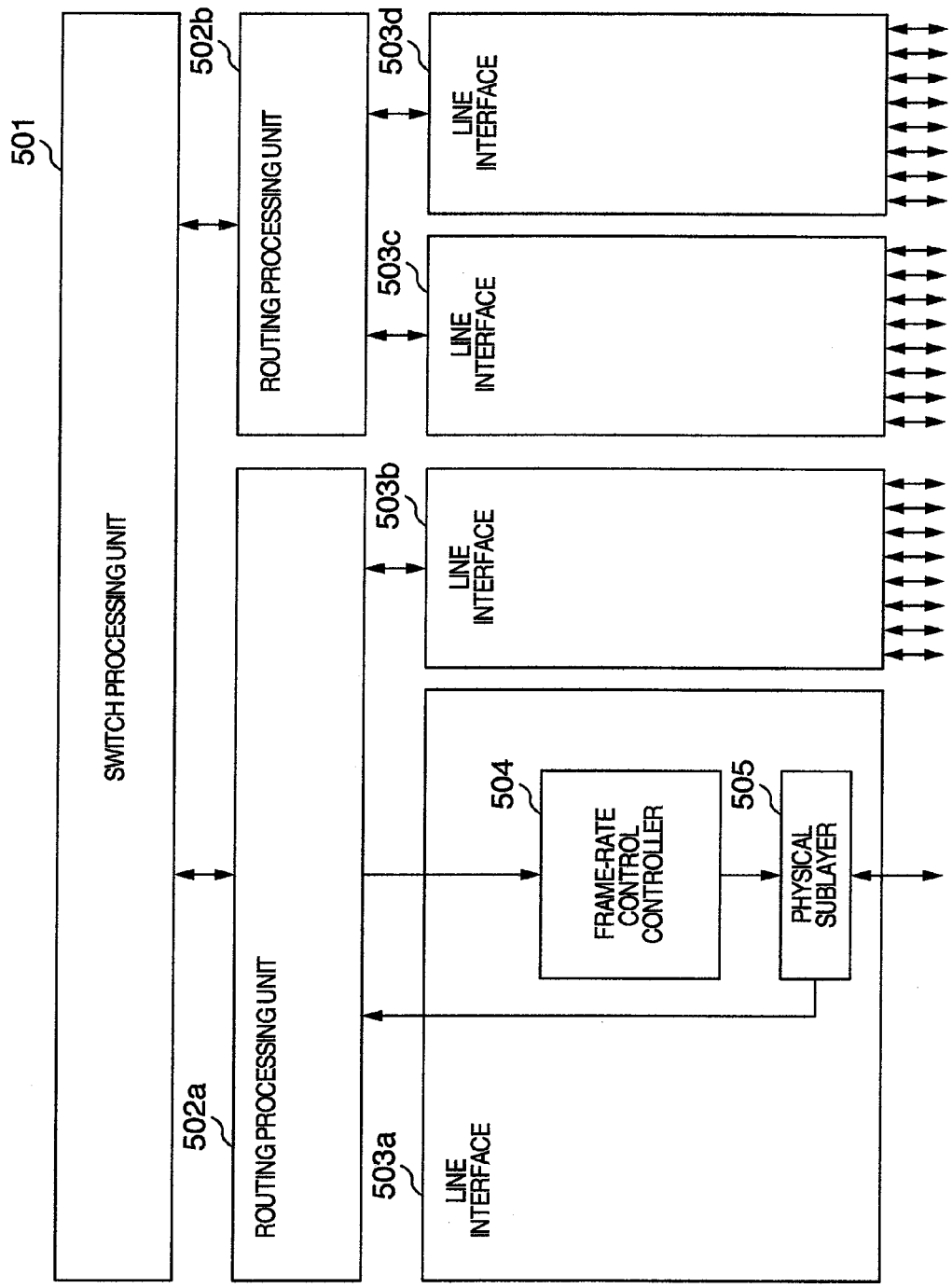
FIG. 5 illustrates a block diagram of the traffic shaping device.

FIG. 5 illustrates an internal block diagram of the traffic shaping device in the present embodiment. Incidentally, the traffic shaping device which possesses the traffic shaping function configured by the present embodiment includes configuration components of line interfaces 503, routing processing units 502, and a switch processing unit 501. Moreover, at least one of the line interfaces 503 is equipped with a frame-rate control controller 504.

Next, the explanation will be given below concerning the function of each configuration component illustrated in FIG. 5.

Each routing processing unit 502 possesses a routing function of receiving a packet from an external communications device via the line interfaces 503, and making reference to the destination IP address and the destination MAC address of the received packet to determine the line interface 503 of the output destination. In order to transfer the received packet to the target delivery destination, each routing processing unit 502 makes reference to a routing table which records therein route information on the delivery destination of the packet, then transferring the packet to the switch processing unit 501 such that the transfer-destination information on the packet (i.e., the line interface 503 in this case) is added to the packet. When each routing processing unit 502 receives a packet from the switch processing unit 501, each unit 502 transfers the packet to the line interfaces 503 which belong to the immediate subordinate to each unit 502.

The switch processing unit 501 possesses a packet switching function of making it possible to dynamically select the route by making reference to the transfer-destination information added to the packet by each routing processing unit 502. The switch processing unit 501 transfers the packet, which is received from each routing processing unit 502, to the routing processing unit 502 of the transfer destination.

Each line interface 503 performs the packet transmission/reception with the external communications device. When each line interface 503 receives a packet from the external communications device, each line interface 503 transfers the received packet to each routing processing unit 502 via a physical sublayer 505. When each line interface 503 receives a packet from each routing processing unit 502, each line interface 503 sends out the packet to the external communications device via the physical sublayer 505. The physical sublayer 505 is a general-purpose component which is in charge of the physical connection of the first layer out of the OSI reference model, such as data expression scheme on the transmission routes and shape of the physical interfaces. Also, in the traffic shaping device configured in the present invention, at least one of the line interfaces 503 is equipped with the frame-rate control controller 504. The frame-rate control controller 504 is a queue component which is in charge of the traffic shaping control according to the present invention. A packet transferred from each routing processing unit 502 is caused to pass through the frame-rate control controller 504. This condition allows execution of the frame-rate control over the packet.

Next, the description will be given below concerning the detailed processing contents of the inside of the frame-rate control controller 504. The frame-rate control controller 504 is a processing control unit for implementing the traffic shaping method according to the present invention. Incidentally, the present invention provides the above-described two types of solving methods (i.e., the SAQ scheme and the LLPQ scheme) in order to solve the different network traffic requirements. Commonality of many of the processings, however, is made implementable between the two solving methods. Consequently, only when differences occur in the processing contents due to the two solving methods, a notice to the effect will be described.

FIG. 6 is a block diagram for illustrating queue configuration and a processing flow in the traffic shaping scheme according to the present invention. The frame-rate control controller 504 in the present invention includes a traffic distribution processing unit 601, user transmission point-in-time processing units 602, scheduling control units 603, user peak-frame-rate control units 604, group peak-frame-rate control units 605, a priority-control processing unit 606, a line peak-frame-rate control unit 607, and a transmission-user information extraction unit 608. The processing units in which the differences occur in the processing contents due to the two solving methods are the traffic distribution processing unit 601, the user transmission point-in-time processing units 602, and the transmission-user information extraction unit 608. Also, in FIG. 6, the traffics are classified into the two-channel group. This group, however, may be expanded into three channels or more if required. Accordingly, it does not limit the scope of the appended claims.

The traffic distribution processing unit 601 possesses a function of making reference to L2/L3 header information on each packet inputted from each routing processing unit 502 to classify the traffics into the group-unit/user-unit/class-unit for each packet, and transferring the reception request, user number, and packet-length information on each packet to the user transmission point-in-time processing units 602, the group peak-frame-rate control units 605, the line peak-frame-rate control unit 607, and the transmission-user information extraction unit 608. Moreover, the traffic distribution processing unit 601 possesses a function of transferring the packet data on each packet to the user transmission point-in-time processing units 602.

Incidentally, the mapping method into the group/user/class needs to be changed depending on the two solving methods according to the present invention. For example, even in the case of the traffics addressed to the same user, in the case of the SAQ scheme, the mapping is performed such that, as illustrated in FIG. 1, the traffics are separated into the service (i.e., telephone/broadcast/Internet) units at the user level. In the case of the LLPQ scheme, on the other hand, the mapping is performed such that, as illustrated in FIG. 4, the traffics are not separated at the user level, but are separated into the different classes within the same user (i.e., service point) in the service (i.e., telephone/Internet) units. This difference arises from the fact that, in the case of the LLPQ scheme, the traffic shaping becomes necessary for each address when the utilization on the WAN services such as Wide-Area Ethernet (: registered trademark) is assumed. Namely, the traffics addressed to the same address needs to be controlled as the same user. Additionally, a function similar to the sort function itself like this may also be given to an external processing block (e.g., the routing processing block illustrated in FIG. 5). Also, the group-number/user-number/class-number in which the sort is to be performed may be expanded if required. Also, header information created newly in an independent and unique manner may be used as the information to be used for the classification.

Each user transmission point-in-time processing unit 602, which is provided on each user (#1~n) basis, possesses a packet buffer for temporarily storing the packet data inputted from the traffic distribution processing unit 601, a function of storing the information on the peak frame rate (hereinafter, referred to as PFR), minimum frame rate (hereinafter, referred to as MFR), and redundant frame-rate distribution ratio (hereinafter, referred to as Weight) set for each user, a function of calculating the available frame rate (hereinafter, referred to as AFR) determined from the values of PFR/MFR/Weight, a function of updating and holding values of AOTIME/POTIME, i.e., the transmission schedule point-in-times which are determined from AFR/PFR, and which become necessary when taking advantage of the available-frame-rate-type scheduling in each scheduling control unit 603, a function of updating and holding the value of each transmission counter which is based on Weight, and which becomes necessary when taking advantage of the WFQ-type scheduling in each scheduling control unit 603, and a function of transmitting the information on AOTIME/POTIME for each user or the information on each transmission counter to each scheduling control unit 603.

The correspondence to be established with FIG. 1 and FIG. 2 is as follows: The unit 602a in FIG. 6 corresponds to the transmission schedule point-in-time calculations 102a and 102b for the broadcast traffics (intermediate-priority users), the unit 602b in FIG. 6 corresponds to the transmission schedule point-in-time calculations 102c and 102d for the Internet traffics (low-priority users), and the notations #1~n correspond to each user (e.g., channel in the broadcast, and connection terminal in the Internet). Incidentally, The correspondence to be established with FIG. 3 is as follows: The unit 602a in FIG. 6 corresponds to the transmission schedule point-in-time calculations 102a and 102b for the broadcast traffics (intermediate-priority users), the unit 602b in FIG. 6 corresponds to the transmission counters 301a and 301b, and the notations #1~n correspond to each user (e.g., channel in the broadcast, and connection terminal in the Internet).

The correspondence to be established with FIG. 4 is as follows: The unit 602a in FIG. 6 corresponds to the class transmission schedule point-in-time calculations 402a and 402b for the telephone traffics (high-priority classes), the unit 602b in FIG. 6 corresponds to the user transmission schedule point-in-time calculations 403a and 403b on each address basis (i.e., total frame rate of the high-priority/low-priority classes), and the notations #1~n correspond to each user (e.g., each service point).

Additionally, a queue that corresponds to the high-priority user/group queue into which the voice traffics are mapped in FIG. 1 to FIG. 3 is omitted in the description in FIG. 6. The group number, however, is arbitrarily expandable, and thus it does not limit the configuration of the present invention. Also, in the case where the user number within the group is one like the high-priority user queue 101a in FIG. 1 to FIG. 3, the inter-users scheduling processing within the group becomes unnecessary. As a result, the user transmission point-in-time processing units 602 and the scheduling control units 603 are unnecessary in the group, and thus the processing becomes omittable.

AOTIME is the transmission schedule point-in-time which is used for the inter-users scheduling control within the group. POTIME is the transmission schedule point-in-time which is provided for checking whether or not the transmission candidate has not exceeded the peak frame rate of the user after the scheduling processing. Incidentally, AFR can be calculated in accordance with the following Expression:

$$AFR=\min\{PFR;MFR+\{(\text{line frame rate or group frame rate})-(\text{sum total of MFRs})\}\times \text{Weight}/(\text{sum total of Weights})\}$$

Here, the notation of min {;} means a processing of returning, as the value, a minimum value out of values separated by; inside { }. If the resultant frame rates acquired by distributing the redundant frame rate are higher than PFR set for each user, the value of PFR is returned as AFR. This processing prevents AFR from exceeding the value of PFR. Also, the sum total of MFRs and the sum total of Weights described above are calculated from a user that is performing the communications. The above-described processing allows MFR of a non-communications user to be distributed to other users as the unused frame rate. Additionally, in order to guarantee MFR of each user, the setting is performed so that the sum total of MFRs of all the users becomes lower than the value of the line frame rate, and so that the sum total of MFRs of the users belonging to the immediate subordinate to each group becomes lower than the value of the group frame rate. If the sum total of MFRs of all the users exceeds 1 Gbps despite the fact of the line frame rate=1 Gbps, or if the sum total of MFRs of the users belonging to the immediate subordinate to a group exceeds 500 Mbps despite the fact of the group frame rate=500 Mbps, it becomes impossible to guarantee the minimum frame rate of each user.

Next, the description will be given below concerning an update processing of AOTIME/POTIME, i.e., the transmission schedule point-in-times which are determined from AFR/PFR, and which become necessary when taking advantage of the available-frame-rate-type scheduling in each scheduling control unit 603. At the time of the packet transmission/reception, AOTIME/POTIME will be updated as follows:

AOTIME/POTIME update operation at the time of the packet reception

FIG. 7 illustrates an update processing flow of the transmission schedule point-in-times at the time of the packet reception. If packets have been accumulated in a packet buffer of a reception user (i.e., No at a step 701), or if the packets have been not accumulated in the packet buffer (i.e., Yes at the step 701) and simultaneously, if the transmission schedule point-in-times are "future" or "present" (i.e., No at a step 702), the transmission schedule point-in-times are held just as they are without being updated (step 704). Also, if the packets have been not accumulated in the packet buffer (i.e., Yes at the step 701) and further, if the transmission schedule point-in-times are "past" (i.e., Yes at the step 702), the transmission schedule point-in-times are updated to "present", thereby holding the new transmission schedule point-in-times (step 703). Namely, the "past" transmission schedule point-in-times in the state where the packets are absent have no meaning, and thus need to be returned back to "present" at the time of the packet reception. Incidentally, here, the explanation will be given regarding the concept of terms of "past"/ "present"/"future". The term "past" refers to a state where the transmission schedule point-in-times had already elapsed, and where the transmission should be performed immediately. The term "present" refers to a state where the time just now is the transmission schedule point-in-times. The term "future" refers to a state where the transmission schedule point-in-times have not expired yet. Additionally, the common operation will be performed with respect to the update processing of AOTIME and that of POTIME.

AOTIME/POTIME update operation at the time of the packet transmission

FIG. 8 illustrates an update processing flow of the transmission schedule point-in-times at the time of the packet transmission. The transmission packet-length (FBYTE) information which becomes necessary when updating the transmission schedule point-in-times is received from the transmission-user information extraction unit 608. Then, the AOTIME/POTIME update for the user is performed in accordance with the following Expression: Incidentally, AFR and PFR mean the available frame rate and the peak frame rate which are set for each user and are stored into the block. Additionally, with respect to parameters described by subscript characters in the subsequent respective Expressions, the parameters described by a subscript character "new" indicate the values after being updated by the packet transmission, and the parameters described by a subscript character "old" indicate the values before being updated before the packet transmission, $$AOTIME_{new}=AOTIME_{old}+AFR\times FBYTE$$

$$POTIME_{new}=POTIME_{old}+PFR\times FBYTE$$

FIG. 8 illustrates the update processing flow of the transmission schedule point-in-times of the user transmission point-in-time processing units 602 according to the two solving methods of the SAQ scheme and the LLPQ scheme. In the case of the SAQ scheme (i.e., in the case of the SAQ scheme at a step 801), the transmission schedule point-in-times of one user queue are simply recalculated by one packet transmission (step 805). On the other hand, in the case of the LLPQ scheme (i.e., in the case of the LLPQ scheme at the step 801), if the traffic of the high-priority class is transmitted (i.e., Yes at a step 802), an update command is issued to each of the user transmission point-in-time processing units 602 of the high-priority/low-priority classes of the user. This update command updates the transmission schedule point-in-times of the high-priority/low-priority classes (step 803). Incidentally, if the traffic of the low-priority class is transmitted (i.e., No at the step 802) in the case of the LLPQ scheme, only the transmission schedule point-in-time of the low-priority class is updated (step 804).

Also, the WFQ-type scheduling scheme may be used in the inter-users processing according to the present invention. Accordingly, next, the description will be given below concerning an update processing of each transmission counter which becomes necessary when using the WFQ-type scheduling in each scheduling control unit 603. Here, each transmission counter is defined as a transmission counter (CN-TIME) which is to be used for the WFQ-type scheduling. Then, at the time of the packet transmission/reception, CNTIME will be updated as follows:

CNTIME update operation at the time of the packet reception

The CNTIME update operation at the time of the packet reception is basically the same as "AOTIME/POTIME update operation at the time of the packet reception". The transmission counter, however, is a pure counter, and thus includes no concept of time therein. Consequently, "past"/"present"/"future" will be replaced as follows: The minimum value out of valid counters of all the users is defined as "present". The case whose value is larger than the minimum value out of the valid counters is defined as "future". The case whose value is not the values of the valid counters is defined as "past".

CNTIME update operation at the time of the packet transmission

The transmission packet-length (FBYTE) information which becomes necessary when updating the transmission schedule point-in-times is received from the transmission-user information extraction unit 608. Then, the CNTIME update for the user is performed in accordance with the following Expression: Incidentally, Weight means each weight which is set for each user and is stored into the block.

$$CNTIME_{new}=CNTIME_{old}+1/Weight \times FBYTE$$

Each scheduling control unit 603 possesses a function of scheduling which of the users should be transmitted first of all in the available-frame-rate-type scheduling scheme or the WFQ-type scheduling scheme.

The correspondence to be established with FIG. 1 and FIG. 2 is as follows: The unit 603*a* in FIG. 6 corresponds to the available-frame-rate scheduler 103*a* for the broadcast traffics, and the unit 603*b* in FIG. 6 corresponds to the available-frame-rate scheduler 103*b* for the Internet traffics.

The correspondence to be established with FIG. 3 is as follows: The unit 603*a* in FIG. 6 corresponds to the available-frame-rate scheduler 103 for the broadcast traffics, and the unit 603*b* in FIG. 6 corresponds to the WFQ scheduler 302 for the Internet traffics.

The correspondence to be established with FIG. 4 is as follows: The unit 603*a* in FIG. 6 corresponds to the available-frame-rate scheduler 404*a* for the telephone traffics, and the unit 603*b* in FIG. 6 corresponds to the available-frame-rate scheduler 404*b* on each address basis (i.e., total of the telephone traffics and the Internet traffics).

When taking advantage of the available-frame-rate-type scheduling, each scheduling control unit 603 carries out a scheduling processing of receiving the information on AOTIME/POTIME of each user from each user transmission point-in-time processing unit 602, and of selecting a transmission candidate using AOTIME. Meanwhile, when taking advantage of the WFQ-type scheduling, each unit 603 carries out a scheduling processing of receiving the information on CNTIME of each user from each user transmission point-in-time processing unit 602, and of selecting a transmission candidate using CNTIME.

AOTIME or CNTIME of each user describes therein the transmission schedule point-in-time of a packet to be transmitted next for each user. Each unit 603 searches for a user whose AOTIME or CNTIME is the oldest of all (i.e., state where the packet should be transmitted as early as possible). Selecting the transmission candidate by making a comparison among AOTIMEs or CNTIMEs of all the users every time necessitates a time for the processing. Accordingly, some ingenuity is needed in the processing. The reason for this is as follows: If the comparison operation for all the users is made every time, the calculation amount increases in an increasing manner of n! as the user number becomes larger. In order to suppress the operation amount, a processing becomes necessary which allows the scheduling-needed processing to be reduced by making a heap sort calculation. In the heap sort calculation, only the sequence of a user is replaced every time a state change in the user occurs. For the high-speed implementation of the processing, there have been generally known such heap processings as quick sort and bubble sort. Incidentally, when implementing the shaping device according to the present invention on the high-speed line, this scheduling processing is needed to be processed at the high speed. For example, when implementing the technology according to the present invention on the 1-Gbps line, it is desirable to retain the processing performance of being capable of finding out the transmission candidate at 672-ns-or-less cycle. The reason for this is as follows: Unless the transmission candidate is made selectable at 672-ns-or-less cycle, it becomes impossible to implement the wire-rate processing which is 100% for the line speed. This fact results in a high danger of exerting a bad influence on the frame-rate control. Each unit 603 transfers, to each user peak-frame-rate control unit 604, information on a user number selected as the transmission candidate and POTIME of this user.

Each user peak-frame-rate control unit 604 possesses a function of monitoring whether or not the peak frame rate set for each user is violated.

The correspondence to be established with FIG. 1 to FIG. 3 is as follows: The unit 604*a* in FIG. 6 corresponds to the user peak-frame-rate shaping 104*b* for the broadcast traffics, and the unit 604*b* in FIG. 6 corresponds to the user peak-frame-rate shaping 104*c* for the Internet traffics. The correspondence to be established with FIG. 4 is as follows: The unit 604*a* in FIG. 6 corresponds to the user peak-frame-rate shaping 405*a* for the telephone traffics, and the unit 604*b* in FIG. 6 corresponds to the user peak-frame-rate shaping 405*b* on each address basis (i.e., total of the telephone traffics and the Internet traffics).

Each unit 604 receives the information on the user number and POTIME of the transmission candidate selected based on the above-described scheduling control, then checking POTIME. If POTIME is found to be "past" or "present", each unit 604 judges that the transmission traffic of the user is transmittable, thereby notifying each group peak-frame-rate control unit 605 about a transmission request and the transmission user number. Also, If POTIME is found to be "future", each unit 604 judges that the transmission traffic of the user is non-transmittable, thereby not notifying each group peak-frame-rate control unit 605 about the transmission request.

Each group peak-frame-rate control unit 605 possesses a packet-number counter for recording how many packets have been accumulated in a packet buffer on each group basis, a function of holding GFR i.e., the peak frame rate set for each group, and GOTIME, i.e., the transmission schedule point-in-time of each group, and monitoring whether or not the peak frame rate is violated, and a function of updating GOTIME at the time of the packet reception and at the time of the packet transmission.

The correspondence to be established with FIG. 1 to FIG. 3 is as follows: The unit 605*a* in FIG. 6 corresponds to the group frame-rate shaping 105*b* for the broadcast traffics, and the unit 605*b* in FIG. 6 corresponds to the group frame-rate shaping 105*c* for the Internet traffics. The correspondence to be established with FIG. 4 is as follows: The unit 605*a* in FIG. 6 corresponds to the group frame-rate shaping 406*a* for the telephone traffics, and the unit 605*b* in FIG. 6 corresponds to the group frame-rate shaping 406*b* on each address basis (i.e., total of the telephone traffics and the Internet traffics).

The processing of monitoring whether or not the peak frame rate is violated is performed as follows: When each unit 605 receives the transmission request via each user peak-frame-rate control unit 604, each unit 605 checks GOTIME. Then, if GOTIME is found to be "past" or "present", each unit 605 judges that the transmission traffic is transmittable, thereby notifying the priority-control processing unit 606 about the transmission request and the transmission user number. Also, If GOTIME is found to be "future", each unit 605 judges that the transmission traffic is non-transmittable, thereby not notifying the priority-control processing unit 606 about the transmission request. The packet-number counter is a function of incrementing the counter by +1 when information on the packet reception is received from the traffic distribution processing unit 601, and of decrementing the counter by −1 when information on the packet transmission is received from the transmission-user information extraction unit 608. If the packet-number counter is larger than 1, the state is a one where the packets of the group have been accumulated. This information will be used for the update processing of the transmission schedule point-in-time at the time of the packet reception, which will be described later. The update processing of GOTIME is performed as follows: When each unit 605 receives a reception request from the traffic distribution processing unit 601 at the time of the packet reception, each unit 605 updates GOTIME to "present" if the packet-number counter of the group is equal to zero, and simultaneously, if GOTIME="past" holds. Each unit 605 does not update GOTIME on conditions other than this. Also, at the time of the packet transmission, each unit 605 receives the transmission request, the transmission user number, and the transmission packet-length (FBYTE) from the transmission-user information extraction unit 608, which will be described later. Then, each unit 605 updates GOTIME of the group in accordance with the following Expression:

$$GOTIME_{new}=GOTIME_{old}+GFR\times FBYTE$$

The priority-control processing unit 606 possesses a function of making the priority processing judgment as to, of the transmission candidates calculated on each group basis, the traffic of the user belonging to which of the groups should be selected. Namely, the priority-control processing unit 606 plays the role of the priority-control processing 106 in FIG. 1 to FIG. 3, and the priority-control processing 407 in FIG. 4.

When the priority-control processing block receives the information on the transmission request and the transmission user number from each group peak-frame-rate control unit 605, if the block has received the transmission request from a plurality of users, the block selects a group of the highest priority from among the plurality of users on the basis of the strict priority control. Then, the block transmits the corresponding transmission request and transmission user number to the line peak-frame-rate control unit 607. Incidentally, a priority-control processing resulting from combining the strict priority control with the WFQ may be used as the priority-control processing according to the present invention.

The line peak-frame-rate control unit 607 possesses a packet-number counter for recording how many packets have been accumulated in a packet buffer on each line basis, a function of holding LFR i.e., the peak frame rate set for each line, and LOTIME, i.e., the transmission schedule point-in-time of each line, and monitoring whether or not the peak frame rate is violated, and a function of updating LOTIME at the time of the packet reception and at the time of the packet transmission. The line peak-frame-rate control unit 607 plays the role of the line frame-rate shaping 107 in FIG. 1 to FIG. 3, and the line frame-rate shaping 408 in FIG. 4.

The contents itself of the processing is completely the same as the case of each group peak-frame-rate control unit 605. The only differences seen from the processing point of view are as follows: Namely, the unit 607 receives the transmission request and the transmission user number via the above-described priority-control processing unit 606, and the external interface of causing the transmission-user information extraction unit 608 to transfer the transmission request and the transmission user number when the transmission traffic is transmittable.

The update processing of LOTIME is performed as follows: When the unit 607 receives the reception request from the traffic distribution processing unit 601 at the time of the packet reception, the unit 607 updates LOTIME to "present" if the packet-number counter of the packet buffer for the line is equal to zero, and simultaneously, if LOTIME="past" holds. The unit 607 does not update LOTIME on conditions other than this. Also, at the time of the packet transmission, the unit 607 receives the transmission request, the transmission user number, and the transmission packet-length (FBYTE) from the transmission-user information extraction unit 608, which will be described later. Then, the unit 607 updates LOTIME of the line in accordance with the following Expression:

$$LOTIME_{new}=LOTIME_{old}+LFR\times FBYTE$$

The transmission-user information extraction unit 608 possesses a function of managing the packet length of the transmission traffic of each user, and a function of expanding the information on the transmission request, the transmission user number, and the transmission packet-length, which become necessary when updating the transmission schedule point-in-time at the time of the packet transmission, to each user transmission point-in-time processing unit 602, each group peak-frame-rate control unit 605, and the line peak-frame-rate control unit 607.

When the unit 608 receives the reception request, reception user number, and reception packet-length from the traffic distribution processing unit 601 at the time of the packet reception, the unit 608 manages the packet length on each user basis into a storage area for managing the packet length of the user number. By managing the packet-length information on each user basis, it becomes possible to read out the transmission packet-length of a transmission user when the transmission user is determined. Also, at the time of the packet transmission, if the unit 608 receives the transmission request and the transmission user number from the line peak-frame-rate control unit 607, the unit 608 makes reference to the packet-length information on the user recorded at the time of the packet reception. Then, the unit 608 transfers the transmission user number, the transmission packet-length, and a transmission schedule point-in-time update request to each user transmission point-in-time processing unit 602, each group peak-frame-rate control unit 605, and the line peak-frame-rate control unit 607, i.e., each frame-rate calculation component.

Incidentally, the points in which the behavior of the transmission-user information extraction unit 608 becomes different depending on the two schemes of the SAQ scheme and the LLPQ scheme are as follows: In the SAQ scheme, it is quite all right to update only the user transmission schedule point-in-time transmitted. On the other hand, in the LLPQ scheme, when the traffic of the high-priority class is transmitted, not only the user transmission schedule point-in-time of the high-priority class, but also the user transmission schedule point-in-time of the low-priority class where the entire frame rate of the user is calculated need to be updated. Accordingly, the update request is transferred to each of the user transmission point-in-time processing units 602 of the high-priority/low-priority classes. Also, when the traffic of the low-priority class is transmitted, the update request is transferred to the user transmission point-in-time processing unit 602 of the low-priority class.

As having been explained in the foregoing description, by carrying out the above-described processings, it becomes possible to provide the traffic shaping device which is capable of solving the problems described earlier.

Incidentally, it is also possible to employ the different schemes (i.e., the SAQ scheme/LLPQ scheme) for each of the line interfaces 503 in FIG. 5. In this case, it becomes possible to provide the traffic shaping device which is capable of taking advantage of both schemes separately depending on such factors as the network environment.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A packet relay device for performing transmission/reception of packets, comprising: a distribution processing unit for classifying traffics into users and classes based on header information of said packets received; a calculation unit for calculating available frame rate for each user and a high-priority class of each user from information on frame rate set in said user and said high-priority class of said each user on the basis of said classified traffics; a first scheduling control unit for updating a transmission schedule point-in-time calculated based on said calculated available frame rate for said each user and said high-priority class of said each user, and judging that packets of said high-priority class should be transmitted in accordance with said transmission schedule point-in-time updated, a second scheduling control unit for updating said transmission schedule point-in-time calculated based on said calculated available frame rate for said high-priority class of said each user, and judging that packets of a non-high-priority class should be transmitted in accordance with said transmission schedule point-in-time updated and a shaping unit for updating said transmission schedule point-in-time for each packet to be transmitted which is the first scheduling control unit and the second scheduling based on said calculated available frame rate for said each user and said high-priority class of said each user, and performing a shaping of said packets at said calculated available frame rate on each user basis and on each user's class basis in accordance with said transmission schedule point-in-time updated; and wherein packets of the high-priority class are to be first processed in case that the packets of the high-priority class is available for transmission.

2. The packet relay device according to claim 1, further comprising: a counter update unit for updating a transmission counter from weight information and transmission packet-length set to said each user; and a third scheduling control unit for performing a WFQ-type scheduling based on said transmission counter of said each user.

3. The packet relay device according to claim 1, further comprising: an update unit for updating said transmission schedule point-in-time which is calculated based on peak frame rate set to each group or each line; and a second shaping unit for performing a frame-rate shaping at said peak frame rate on each group or each line basis in accordance with said transmission schedule point-in-time updated.

4. The packet relay device according to claim 1, further comprising a priority-control processing unit for performing a strict priority control over said transmission of said packets of each group in correspondence with degree of priority of each group, and wherein: said priority-control processing unit performs a processing as inter-groups priority-control processing, said processing being acquired by combining said strict priority control and WFQ with each other.

* * * * *